May 9, 1967 L. H. STRAUSS 3,318,306

GILL TYPE UNDERWATER BREATHING APPARATUS

Filed March 25, 1965

INVENTOR
LEWIS H. STRAUSS

BY Semmes & Semmes

ATTORNEYS

United States Patent Office 3,318,306
Patented May 9, 1967

3,318,306
GILL TYPE UNDERWATER BREATHING
APPARATUS
Lewis H. Strauss, 9012 Congressional Court,
Potomac, Md. 20854
Filed Mar. 25, 1965, Ser. No. 442,697
1 Claim. (Cl. 128—142)

The present invention relates generally to a method for breathing under water and in particular to a suggested artificial membrane gill system for use within a closed circuit breathing system.

The past decade has witnessed a rapid advance in the availability of thin membranes based on silicone and fluorocarbon chemistry. The existence of such membranes has directly affected the bio-medical field and led to the development of wettable exchange membranes for dialysis (kidney function) and more recently, with increasing interest in extra-corporeal circulation, to the development of membrane oxygenators. The availability of using such membranes for human underwater breathing will become apparent from the following description of the present invention.

Underwater breathing of fish is accomplished by removing oxygen from sea water and admitting by means of their gills the oxygen into their blood. In the case of fish, the circulating body fluids in the gill are placed adjacent to the membrane with the sea water on the other side. Unfortunately, mammals cannot take advantage of such a system as it would result in a catastrophic loss of certain ions through the barrier. The present invention contemplates that the normal air breathing system of the mammal is left undisturbed while the air is allowed to exchange its constituents with water through a suitable membrane. Under the proper conditions and gradients of partial pressure, the oxygen dissolved in the water is made to migrate or diffuse across the membrane into the air with the $CO_2$ moving in the opposite direction, thus enabling man to remain under water for considerable periods of time without a supply of oxygen either carried with him or delivered from the surface.

At present, membrane systems have advanced to the stage where there can be no doubt as to their ability to perform the desired function necessitated by requirements of underwater breathing. Such membrane systems are already in use in heart-lung machines and one need only recall the well publicized demonstration of rodents living under water using a membrane for oxygen supply. See General Electric Company Research Lab Bulletin, winter 1964–65, page 7. Present silicone membranes one mil thick are capable of diffusing 1200 ml./min. $O_2$ per meter$^2$ per atmosphere partial pressure difference. They are about twice as transparent to $CO_2$ and half as transparent as to nitrogen. Teflon based membranes are about 2% as efficient as diffusers of oxygen. These figures simply mean that all the above gases flow through membranes with relative ease and, in particular, in any gill system nitrogen will be in pressure equilibrium with its dissolved phase. This last assertion is of particular importance and will be discussed more fully hereinafter.

That there is sufficient oxygen dissolved in water for performing the present underwater breathing method can hardly be doubted. Countless large teleost fish ranging in weight to one thousand pounds and with oxygen requirements comparative to that of man are able to maintain themselves with sophisticated gills of moderate size. The amount of oxygen found dissolved in water depends, of course, on several factors, principally the temperature. In the surface layers of the sea, for example, from 4 to 7 ml./liter of oxygen are generally found dissolved. About 100 liters of sea water contain enough oxygen to support an active man for one minute if all the oxygen is extracted.

$CO_2$ is also found dissolved in sea water but mostly in the form of $CaCO_3$ and carbonate ions. Due to the high pH and low partial pressure, very little is in the form of free gas. It is important to realize that the gases dissolved in water have a total pressure equal to that at the surface. That is to say, the partial pressure of oxygen is about 155 mm. Hg, of nitrogen 580 mm. Hg, and a few mm. Hg of $CO_2$ at all depths.

Living systems have rather strict tolerances for oxygen partial pressure and for this reason, a working minimum of 110 mm. Hg has been chosen as the lowest value consistent with practical interest. This is the equivalent to breathing at an altitude of ten thousand feet. Between the liquid system and the gas system there will be a maximum oxygen partial pressure difference of just under 50 mm. Hg and an average partial pressure difference of about 30 mm. Hg available to drive the oxygen through the membrane. This implies, of course, that only one third of the oxygen dissolved in the water can be usefully extracted. Thus, for the present invention, a theoretical minimum of 300 liters/min. throughput of water will be necessary. Nitrogen pressure will equilibriate as previously mentioned and the $CO_2$ partial pressure will build up to about 15 mm. Hg. The slightly lower driving pressure available for the $CO_2$ is compensated for by the fact that the membrane diffusion rate for this gas is nearly precisely twice that for oxygen. The additional gas required to make up the difference between internal and hydrostatic pressure is discussed hereinafter.

As previously referred to, the gases with which the present invention is concerned are not at the hydrostatic pressure of the water in which they are dissolved. With the $O_2$, $CO_2$, and nitrogen partial pressures as listed, some method must be found to make up the approximately 800 mm. Hg difference in pressure which would exist at thirty three feet of water, for example, or the present gill system would collapse.

It is of little use to consider the continual addition of nitrogen to the system, although this would perform the necessary support function, since the diffusion rate for nitrogen is about one half that of oxygen and since the partial pressure gradient would be 800 mm. Hg, the actual volume escape rate of the nitrogen being sixteen times the oxygen rate, or nearly one liter/min. From the storage point of view, no gain would have been made over current Navy closed circuit oxygen systems. Mechanical support is possible, of course, by using a wire mesh backing or similar technique such as employed in the General Electric rodent experiment referred to above. Although such mechanical support is possible at shallow depths of a few inches, structural complications would be present if applied to the present invention.

In the present invention it is contemplated to solve the support problem by filling the system up to the ambient external hydrostatic pressure with an inert gas which will not pass the membrane barrier. There are, however, very few gases with the desired large molecule size and/or low solubility in water in addition to the required non-toxic characteristics. In addition, most large molecular weight gases are either soporific or poisonous to a greater or lesser degree.

It has been found that the desired gas characteristics necessary to solve the present internal support problem are present in octafluorocyclobutane. This gas, which is cyclic, $C_4F_8$, is available in experimental quantities as Freon C–318 and has a molecular weight of about two hundred, a very low solubility in water (0.005 wt. percent) and accordingly a low diffusion rate through membranes. Octafluorocyclobutane boils at 45 p.s.i.a. at room temperature and is therefore easily stored in large quantity in the liquid phase. This gas is odorless and extensive toxicity studies of animals exposed for months to high concentrations show no effect on growth, activity, or condition nor in the pathological picture of internal organs of sacrificed animals. See Toxicity Studies With Octafluorocyclobutane, J. W. Clayton, et al., Jour. Amer. Industrial Hygiene Assoc., No. 21, October 1960. In addition, this gas has been tentatively approved by the FDA for use as a propellant in food dispensers, a good indication of its harmless nature.

Another major problem in the design of the present artificial gill system relates to the contact area between the liquid and the membrane surface. At first glance, it may seem that a large enough membrane area of sufficient diffusivity will solve the problem of adequate gas transfer. This is, of course, not the case. In fact, if the unit volume of fluid does not remain in the system long enough for the oxygen molecules to move to the membrane wall then the best membrane conceivable will be of no avail.

Since the rate of diffusion of gases in gases is literally million of times greater than that of gases in liquids, $CO_2$ presents no problem since it is highly mobile. In the design of the present gill system, it is the rate of diffusion of oxygen across the capillary region to the membrane which deserves attention and requires the greatest amount of theoretical calculation and experimentation.

In living systems, the capillaries are very narrow in the range of five to ten microns. When $CO_2$ is released from the red cell, it is probably extremely near the membrane. Nevertheless, it is believed that about half of the impedance to the movement of $CO_2$ in the living organism occurs in the transfer across the capillary. See Exchange of Gases Between Alveolar Air and Pulmonary Capillary Blood: Pulmonary Diffusing Capacity, R. E. Forster, Physiological Reviews, 37, No. 4, October 1957. In the case of the present system, the capillaries can not be this narrow but may be on the order of 1 mm. in diameter and thus the question of the migration of oxygen from the capillary axis to the membrane wall attains great importance.

The two methods by which oxygen may move transversely across the capillary are by (1) gradient diffusion and (2) gross transport of fluid. Which method prevails depends on the kind of flow in the capillary. Normally, in long tubes, laminar flow exists for conditions which might exist in the present invention, namely for Reynolds numbers below 2,000. To reach this figure in water, the product of the tube diameter and the flow velocity (both in centimeters) would have to be at least 20. In laminar flow, there is no mass transport of water towards the tube wall and the oxygen must move by random walk process in the direction of the concentration gradient. In this type of motion, as shown by Stokes and others, the mean square distance moved by the molecule is proportional to the time and one thus pays a heavy time penalty for wide tubes. If the flow is to be laminar, extremely narrow capillaries will be necessary.

The preferred method is to develop turbulent flow in which the resulting eddies carry the oxygen to the wall. One can induce turbulence into otherwise laminar flow by increasing or varying the flow rate, roughening the walls, or making sudden changes in the diameter of the tube. It may be that, in turbulent conditions, the mean velocity of the motion of oxygen toward the wall can be made linear in time, $t = R/v$, where $t$ is the time required and $R$ is the capillary radius. Another time is that of the fluid in the system which can be written $\pi R^2 LN/W$ where L is the capillary length, N the number of parallel capillaries and W the volume flow per second of water in the system. If it is fair to say that the two times must be of the same order for the oxygen to get to the membrane before leaving the system, one may then derive a design criterion:

$$\frac{A}{W} = \text{constant}$$

Where A is the total wetted area of membrane in the system, $2\pi RNL$. This criterion tells one that, independent of membrane characteristics, the ratio of membrane area to volumetric fluid flow must remain constant. From the heart-lung researches, it appears that the transverse velocities are likely to be as low as 0.05 cm./sec. which requires the membrane area for a 300 liter/min. flow equal to 20 meter$^2$. This is greater than the required area based on membrane diffusivity alone and once more points to the uncertainty of assuming that better membranes guarantee better gills.

The designers of machines for extra-corporeal circulation have pioneered the route for the present invention. They have demonstrated the importance of a multitude of parallel capillaries with carefully balanced flow impedances. These capillaries may be, for example, 60 cms. long and 1 mm. in diameter in order to take maximum advantage of the wetted area in a given volume.

The present invention envisions the use of a sandwich stack of identical plates with capillaries in or on their surfaces. Interspersed between the plates is a double layer of membrane. Small channels result from squeezing the stack together. Air flows in these inner channels. Water flows in the outer channels between the membrane and plate. Numerous minor sophistications can be incorporated in the present system for flexibility in design. For example, if the stack is assembled with spacers of deformable material between adjacent plates, external pressure can then exert some influence on the size and shape of the capillaries in all or in part of the system.

Accordingly, an object of the present invention is to provide a method and suggested apparatus for breathing under water.

Another object of the present invention is to provide a method and suggested apparatus for exchanging gases, and in particular oxygen and carbon dioxide with those constituents as dissolved in water, enabling man to remain under water for considerable periods of time without a supply of oxygen either carried with him or delivered from the surface.

Still another object of the present invention is to provide a method and suggested apparatus for enabling a man to breathe under water with the use of a closed circuit breathing system employing an artificial membrane gill.

Still a further object of the present invention is to provide a method for insuring the necessary internal support for an artificial membrane gill employed within a closed circuit breathing system to resist the surrounding differences in pressure.

A further object of the present invention is to provide a method for insuring that the unit volume of fluid remains in the artificial membrane gill of a closed circuit breathing system long enough for the oxygen molecules to move to the membrane wall for maintaining proper contact.

Still further objects of the present invention will become apparent from the ensuing specification and attached drawings wherein.

Figure 1:
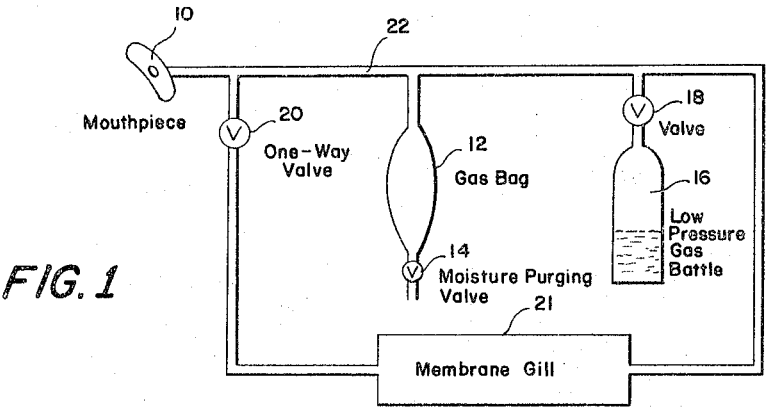
FIG. 1 illustrates schematically a conventional closed circuit breathing system including mouthpiece, gas bag with moisture purging valve, low pressure gas bottle with volume adjusting valve, the subject artificial membrane gill, and associated system tubing.

As seen in FIG. 1, the closed circuit breathing system consists of the customary mouthpiece 10, gas bag 12, moisture purging valve 14, low pressure gas bottle 16, valve 18, one-way valve 20, gill-like device 21, and associated tubing 22. Gas bag 12 is conventional and used to smooth the pulsating flow while low pressure gas bottle 16 with valve 18 allows the wearer to adjust the volume of gas in the system as customarily done in closed circuit systems. Because of the nature of the gas employed in the present invention, bottle 16, containing both liquid and gas, need only be suitable for low pressures. The necessary framing and structural arrangement for supporting the component parts of the closed circuit breathing system are conventional and not illustrated.

Figure 2:
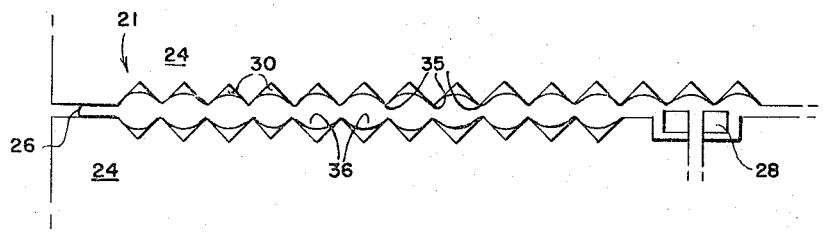
FIG. 2 is an end view of one of the identical layers of capillaries of the subject artificial membrane gill.

The artificial gill 21 consists of a set of identical layers of capillaries through which the breathing mixture flows separated from the oxygen saturated water by a thin plastic membrane. These layers may lie in a plane, in which case the system is built up much like a multi-layer sandwich, or the layers may be concentric if packaging requirements demand. A description of one of the identical layers of the gill-like device 21, as illustrated in FIGS. 2 and 3, is set forth hereinafter.

The reference numeral 24 generally designates a pair of plates, shown lying in a plane in this embodiment, which may be of metal or molded plastic. Closed bag 26 is located between plates 24 and may be made of a very thin (one mil) silicone rubber membrane with a high diffusion rate for oxygen and carbon dioxide. The air-tight intake and exhaust lines for bag 26 are generally designated by the reference numerals 28 and 29 and consist of mushroom-type fittings. On the inside surface of plates 24 are inscribed or molded a series of channels 30 running from one edge of the plates to the opposite edges thereof. Channels 30 are about one (1) mm. across and one (1) mm. deep, or less and must be as nearly identical as possible.

Figure 3:
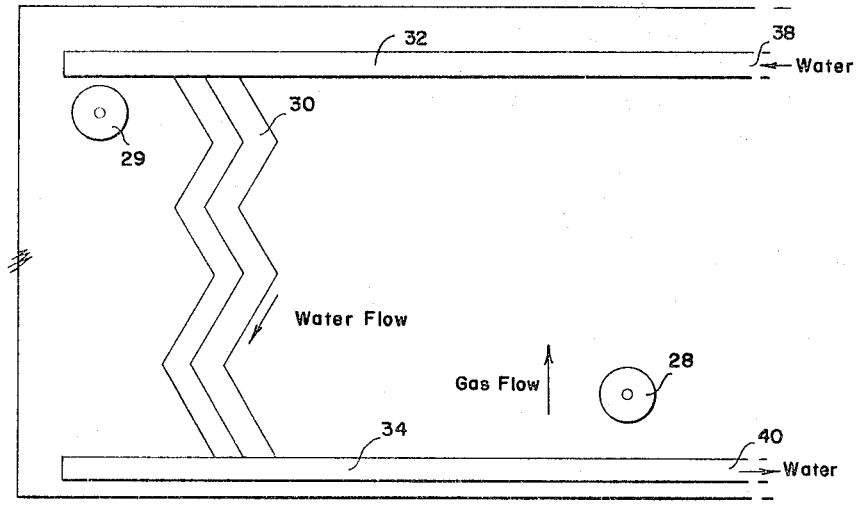
FIG. 3 is a top view of one of the identical layers illustrated in FIG. 2.

As seen in FIG. 3, channels 30 are connected to plenum channels 32 and 34 at their respective ends. The ridges 35 between channels 30 must, of course, be fairly narrow at their top edges. The plates 24 are assembled together with plastic bag 26 between them by pressing together with the proper pressure and securing under conditions such that the pressure of the gases in the bag 26 properly balance the water pressure. Then, the plastic material of bag 26 takes the position shown across channels 30. It can be seen from FIG. 2 that the proper compression of plastic bag 26 between the plates 24 completely defines channels 30 through which the water flows and channels 36 (only partially shown) within bag 26 through which gas flows in the opposite direction. It must be emphasized that channels 36 are only partially formed as illustrated in FIG. 2 since plates 24 are not fully pressed together. As seen in FIG. 3, water is led into inlet 38 of plenum channel 32, thence through the channels 30 to the plenum channel 34 from whence it is exhausted to the water outside at outlet 40. Again, it is emphasized that the flow of gases in the bag 26 is opposite to the flow of water in channels 36. Transfer of oxygen from the water channels 36 to the gas channels 37 and carbon dioxide in the reverse direction occurs across the many divided surfaces. It is important to note, as seen in FIG. 3, that channels 30 in plates 24 are non-linear. They may be zig-zag, as illustrated, or may take the form of offsets or islands. Any one of a number of arrangements are satisfactory as long as the flow pattern of the water is broken up into eddies rather than flowing smoothly.

The number of channels on each plate is, of course, arbitrary and depends on the demand and the number of identical plates used. A stack of fifty sections, each containing five hundred channels, two hundred fifty channels per plate, will contain twenty-five thousand channels which is sufficient to provide a very large flow aperture for both water and air. The cross-section for water flow in each channel is about 1 x 0.5 mm. so that the total clear aperture for water is about 125 cm.² To meet the needs, assuming one third oxygen removed, water velocity equals 1 knot.

In order to provide sufficient membrane area for the transfer of the gases at the pressure differences existing (average about 30 mm. Hg for oxygen) it is necessary to have about 12 m.² of membrane surface. For the twenty-five thousand channels, each about 1 mm. wide, the individual length of each channel must be about 60 cm. Since the channels shown are zig-zag, this is accomplished in about 40 cm. The overall size of the artificial gill device is summarized, then, as follows:

Width: 250 channels x 1 mm.+10% for dividing ridges— about 30 cms.
Length 40 cm.+plenums and edges=45 cms.
Height: 50 sections x (4 mm. gas channel+2 mm. water channels+5 mm. plate thickness)=50 x 11 mm.= 55 cm.
Total water and gas flow cross-section=125 cm.² each, approximately.
Total membrane area=15 meter².
Mean oxygen pressure difference=30 mm. Hg.

$$\text{Membrane diffusion coeff.} = \frac{1200 \text{ millimeter} \times \text{mil}}{\text{m.}^2 \text{ min. atm.}}$$

Of course, the exact dimensions of the gas and water channel areas depends on how hard the stack is squeezed together. The gas channels must be large enough so that the total pressure drop along any one channel does not exceed a couple of centimeters Hg. Since the gas is more viscous than air, as explained below, a larger aperture is required than is apparent at first glance.

To operate the present system under water, it is necessary that the gas pressure be equal to the hydrostatic pressure, as is true in all such breathing systems. This means, of course, that the gas inside the system will have a much larger pressure than the gas dissolved in the water since the latter is only a total of 760 mm. Hg at all depths. Thus, the nitrogen will rapidly escape from the system until the total pressure of nitrogen and oxygen are equal to their corresponding partial pressures as dissolved in the water. Obviously, another method is needed to provide the additional pressure to make up the hydrostatic value.

This additional pressurizing gas must not pass through the membrane walls of bag 26 nor dissolve to any great extent in water. The selected gas is octafluorocyclobutane ($C_4F_8$) sold in the trade as Freon C–318. This gas, as indicated before, is entirely non-toxic and has been approved for use in food dispensers by the FDA. Octafluorocyclobutane has a vapor pressure, at room temperature, of about 45 p.s.i. and hence can be stored in a light walled metal container in the liquid phase. In the present invention, as seen in FIG. 1, the octafluorocyclobutane is contained in gas bottle 16, control to the system being provided for in valve 18. In this manner, the breathing bag 12 is kept properly extended at various depths. The octafluorocyclobutane is not consumed and is lost only when rising through valve 14. On a subsequent descent, it may be again added.

Manifestly, numerous modifications of the present artificial gill-like device may be envisioned without departing from the scope of invention as defined by the sub-joined claim.

I claim:

An underwater closed circuit breathing system containing as an integral part thereof a mouth-piece, gas bag with moisture purging valve, low pressure gas bottle with associated valve and a one-way valve in combination with an artificial gill-like device for exchanging oxygen and carbon dioxide with those constituents dissolved in water, comprising layers of capillaries, each of said layers including:

(A) pairs of plates having channels of predetermined non-linear configuration defined by ridges located on the inside surfaces thereof, said channels terminating at their ends in inlet and outlet plenums for the passage of water;

(B) a closed membrane including a gas inlet supported within said outlet plenum and connected to said mouthpiece and a gas outlet supported in said inlet plenum and connected to said low pressure gas bottle having a high diffusion rate of oxygen and $CO_2$ compressed between said plates to define inner channels for the passage of gas between those portions of said bag abutting said ridges of said channels while defining outer channels for flowing of water in an opposite direction from the passage of the gas, said outer channels being aligned with said inner channels; and (C) gas means located in said gas bottle for equalizing gas and hydrostatic pressure comprising octafluorocyclobutane ($C_4F_8$) which has a low diffusion rate through said membrane bag and which is incapable of being dissolved to any great extent in water, said octafluorocyclobutane being introduced into said closed bag at a pressure sufficient that when combined with atmospheric pressure, gaseous pressure inside said membrane will be equivalent to hydrostatic pressure.

References Cited by the Examiner

UNITED STATES PATENTS

| | | | |
|---|---|---|---|
| 2,384,821 | 9/1945 | Downing | 260—648 |
| 3,060,934 | 10/1962 | Claff et al. | 128—214 |
| 3,187,056 | 6/1965 | Tatlow et al. | 260—648 |
| 3,228,394 | 1/1966 | Ayres | 128—142 |

FOREIGN PATENTS 221,101  3/1959  Australia.

RICHARD A. GAUDET, *Primary Examiner.*

W. E. KAMM, *Assistant Examiner.*